United States Patent
Kia et al.

(10) Patent No.: US 8,559,757 B1
(45) Date of Patent: Oct. 15, 2013

(54) PHOTOGRAMMETRIC METHOD AND SYSTEM FOR STITCHING AND STABILIZING CAMERA IMAGES

(75) Inventors: Omid Ebrahimi Kia, North Bethesda, MD (US); Shiloh L. Dockstader, Oakton, VA (US)

(73) Assignee: Exelis, Inc., McLean, VA (US)

( * ) Notice: Subject to any disclaimer, the term of this patent is extended or adjusted under 35 U.S.C. 154(b) by 656 days.

(21) Appl. No.: 12/729,591

(22) Filed: Mar. 23, 2010

(51) Int. Cl.
*G06K 9/32* (2006.01)

(52) U.S. Cl.
USPC .......................................................... 382/294

(58) Field of Classification Search
USPC .................................................. 382/284, 294
See application file for complete search history.

(56) References Cited

U.S. PATENT DOCUMENTS

| | | | | |
|---|---|---|---|---|
| 6,895,126 B2* | 5/2005 | Di Bernardo et al. | ........ | 382/284 |
| 7,596,281 B2* | 9/2009 | Irani et al. | ...................... | 382/276 |
| 7,873,182 B2* | 1/2011 | Andrew et al. | ............... | 382/100 |
| 8,073,259 B1* | 12/2011 | Jin | ................................. | 382/190 |
| 8,090,429 B2* | 1/2012 | Vija et al. | ....................... | 600/427 |
| 8,326,087 B2* | 12/2012 | Perronnin et al. | ............ | 382/294 |
| 2004/0071367 A1* | 4/2004 | Irani et al. | ...................... | 382/284 |
| 2005/0207672 A1* | 9/2005 | Bernardo et al. | ............. | 382/284 |
| 2005/0271300 A1* | 12/2005 | Pina | ............... | 382/294 |
| 2008/0199043 A1* | 8/2008 | Forsgren | ...................... | 382/103 |

OTHER PUBLICATIONS

Holtkamp, David J.; Goshtasby, A. Ardeshir. "Precision Registration and Mosaicking of Multicamera Images," IEEE Transactions on Geoscience and Remote Sensing, Vol. 47, No. 10, Oct. 2009.

Reynolds, Jr., William D.; Campbell, Derrick S. A Scalable Video Stabilization Algorithm for Multi-Camera Systems, IEEE Explore, Jan. 1, 2010.

Yang, Gehua; Stewart, Charles V.; Sofka, Michal; Tsai, Chia-Ling "Registration of Challenging Image Pairs: Initialization, Estimation, and Decision," Department of Computer Science, Rensselaer Polytechnic Institute, Troy.

Irani, Michael; Rousso, Benny; Pele, Schmuel. "Recovery of Ego-Motion Using Image Stabilization." Institute of Computer Science, The Hebrew University of Jerusalem, IEEE Eplore, 1994.

Ramachandran, Mahesh; Chellappa, Rama. Stabilization and Mosaicing of Airborne Videos, Department of Electrical and Computer Engineering, University of Maryland, College Park, MD, IEEE, 2006.

\* cited by examiner

*Primary Examiner* — John Strege
(74) *Attorney, Agent, or Firm* — RatnerPrestia (57) ABSTRACT

A system for registration of images includes a processor for receiving a temporal sequence of frames from multiple cameras viewing a region of interest. The temporal sequence of frames obtained by one camera is precisely timed to the temporal sequence of frames obtained by the other cameras. The processor modifies the temporal sequence of frames into a hierarchical sequence of frames. The hierarchical sequence of frames includes at least first and second levels. The processor registers frames belonging in the first level separately from frames belonging in the second level. The first level includes frames having a first amount of pixel overlap between one frame and another frame, and the second level includes frames having a second amount of pixel overlap between one frame and another frame. The first amount of pixel overlap is greater than the second amount of pixel overlap. The system may also include a third level of frames, in which the third level includes frames having a third amount of pixel overlap between one frame and another frame. The third amount of pixel overlap is smaller than the first amount or the second amount.

9 Claims, 11 Drawing Sheets

SAMPLING ORDER

| R | S | R | D | S | R | S | R |
|---|---|---|---|---|---|---|---|
| $t_0$ | $t_1$ | $t_2$ | $t_3$ | $t_4$ | $t_5$ | $t_6$ | $t_7$ |

PHOTOGRAMMETRIC METHOD AND SYSTEM FOR STITCHING AND STABILIZING CAMERA IMAGES

FIELD OF THE INVENTION

The present invention relates, in general, to processing images taken by multiple electro-optical (EO) cameras, or multiple infrared (IR) cameras. More specifically, the present invention relates to registration and mosaicking of multiple images taken from airborne surveillance of a region of interest (ROI).

BACKGROUND OF THE INVENTION

Remote imaging systems are in use in many applications ranging from convenience store monitoring cameras to sophisticated imaging systems on satellites in space. Such systems typically include an imaging sensor comprised of light-gathering optics, a detector array and support electronics that produce an electronic video signal transmitted to a remote site for human operator viewing and recording.

The imaging sensor is often rotated about one or more axes (usually using a set of gimbals) or translated in space to view an area that is larger than that covered by the sensor's field of view. Often, the sensor's optical system contains a zoom lens or switchable elements that allow the field of view to be changed for greater resolution, or for a larger field of view. In most applications, the images received from the remote sensor are recorded for later viewing and/or processing by observers at remote sites.

Image registration may be defined as a process of spatially aligning two or more images of a scene. This basic operation is often used for remote sensing applications that involve two or more images of a region of interest. Image mosaicking may be defined as a process of smoothly piecing together overlapping images of a scene into a larger image. This operation is used to increase the area of coverage of an image without sacrificing its resolution. An image mosaic is created from a set of overlapping images by registering and resampling all images to the coordinate space of one of the images.

When multiple cameras are positioned close to each other in a camera housing, the distance to the scene, or the region of interest, may be assumed to be the same. The distance and elevation angle to the scene, however, may likely change from one set of images to the next set of images. If this change is not negligible, overlapping images may have geometrical differences, which need to be considered.

Typically, a transformation model representing local geometric differences between overlapping images are used to register the images. The transformation model considers geometrical differences in the overlapping regions between each camera in the housing, and geometrical differences occurring in each camera due to temporal changes in the distance and elevation angles to the scene. Thus, achieving precision registration among multiple cameras is a difficult problem.

The transformation model is typically aided by a host of sensors found in an aircraft, or in an unmanned airborne vehicle (UAV). The sensors may include an inertial measuring unit (IMU) with gyros and accelerometers. These sensors provide independent information about the motion of the cameras disposed in the camera housing (or rig). The information, or metadata, includes the intrinsic parameters of each camera. It also provides the orientation of each camera with respect to a World Coordinate System (WCS) for each frame in a sequence of frames.

Image registration may also be enhanced by various features known to be found within the scene, or region of interest. Such features may include known landmarks. Thus, feature based registration first processes image intensities to identify unique landmarks, or control points in the images. These control points are then used to register the sequence of images.

As these control points move from one image to the next image, the motion may be quantified and used in the temporal characterization of the sequence of images. This motion, as seen by the sequence of images, is known as optical flow. As used herein, optical flow is a two-dimensional velocity field in the image plane induced by relative motion of an imaging sensor (camera) and/or an object(s) in the field-of-view (FOV).

Optical flow, at the pixel level, generally assumes a constancy in the spatial and temporal variations of the image brightness in the FOV. While this may be a valid assumption with an array of electro-optical (EO) cameras housed in an aircraft rig, it generally is not valid with an array of infrared (IR) cameras housed in a similar aircraft rig.

When considering optical flow, it is difficult to match overlapping images taken by a single camera (intra-camera) housed in an aircraft. It is even more difficult to match overlapping images taken by multiple cameras (inter-camera) housed in the same aircraft. The latter difficulty stems from varying image characteristics resulting from pixel variations among different cameras.

Thus, temporal registration of intra-camera images and temporal registration of inter-camera images are a continuing problem, when using multiple EO cameras disposed in an aircraft. The problem is compounded, when using multiple IR cameras in an aircraft. The present invention, as will be explained, deviates from temporal registration used by conventional methods. Instead, the present invention uses a photogrammetric, hierarchical approach in registering images between intra-camera frame sequences and registering images among inter-camera frame sequences. The present invention is described below.

SUMMARY OF THE INVENTION

To meet this and other needs, and in view of its purposes, the present invention provides a system for registration of frames obtained by multiple cameras includes a processor for receiving a temporal sequence of frames from multiple cameras viewing a region of interest, wherein the temporal sequence of frames obtained by each camera corresponds to the temporal sequence of frames obtained by another camera. The processor modifies the temporal sequence of frames into a hierarchical sequence of frames, wherein the hierarchical sequence of frames includes at least first and second levels. The processor registers frames belonging in the first level separately from frames belonging in the second level. A storage device is included for storing the frames registered in the first level and the second level.

The first level includes frames having a first amount of pixel overlap between one frame and another frame. The second level includes frames having a second amount of pixel overlap between one frame and another frame. The first amount of pixel overlap is greater than the second amount of pixel overlap. The first and second amounts of overlaps between one frame and another frame are overlaps between inter-camera frames, intra-camera frames, or both inter-camera frames and intra-camera frames.

The system may further include a third level of frames. The third level includes frames having a third amount of pixel overlap between one frame and another frame. The third amount of pixel overlap is smaller than the first amount or the second amount.

The camera views the region of interest in a circle of persistence (COP). The first level of frames includes frames of an inner portion of the COP. The second level of frames includes frames of an outer portion of the COP. If the system includes a third level of frames, then the third level includes frames of a peripheral portion of the COP. The peripheral portion of the COP is located at a distance further from the inner portion of the COP than a distance of the outer portion of the COP from the inner portion of the COP.

Each of the temporal sequences of frames includes a Zig-2 pattern of frames, numbered sequentially from 0 through 7. The first level of frames includes frame 3 of each camera in the Zig-2 pattern. The second level of frames includes frames 0, 2, 5 and 7 in the Zig-2 pattern. If there is a third level, then the third level includes frames having a third amount of pixel overlap between one frame and another frame. The third amount of pixel overlap is smaller than the first amount or the second amount. The third level of frames includes frames 1, 4 and 6 in the Zig-2 pattern.

The frames in the first level are stitched together, reducing the amount of pixel overlap between frames in the first level. The frames in the second level are separately stitched together, reducing the amount of pixel overlap between frames in the second level. The frames stitched together in the first level are then mosaicked with the frames stitched together in the second level.

Another embodiment of the present invention includes a system for registration of frames obtained by multiple cameras. The system includes a processor for receiving a set of sequential frames from each of the cameras. Each set of sequential frames has a sequence of time stamps that corresponds temporally to each other set of sequential frames obtained by each of the other cameras. The processor selects a number of frames, which is between one frame but less than a total number of frames in each set. The processor registers the selected number of frames in each set with the selected number of frames in each other set.

The processor selects one frame for each set of sequential frames. The selected one frame is located at an inner portion of a field of view in a circle of persistence (COP). The selected one frame of each camera, which is located at the inner portion of the COP, is registered with the selected one frame of the other camera.

The processor selects at least one frame for a first set of sequential frames and at least one frame for a second set of sequential frames. The at least one frame for the first set includes an overlap of pixels with the at least one frame for the second set of sequential frames. The selected at least one frame of the first set and the selected at least one frame of the second set are registered to each other. The selected at least one frame of the first set and the selected at least one frame of the second set include the same time stamp period.

Also included in the system is a control information base (CIB) for storing a predetermined point of interest. The processor is configured to extract a point of interest, after registration of the selected number of frames in each set with the selected number of frames in each other set. The extracted point of interest is used to update the predetermined point of interest stored in the CIB.

Still another embodiment of the present invention is a method for registering frames obtained by multiple cameras. The method includes the steps of:

(a) receiving a set of sequential frames from each of the cameras, wherein each of the sets has the same sequence of time stamps;

(b) selecting a first sub-set of frames, wherein the first sub-set of frames includes a number of frames between one and less than the total number of frames in the set;

(c) selecting a second sub-set of frames, wherein the second sub-set of frames includes a number of frames between one and less than the total number of frames in the set;

(d) selecting the first sub-set of frames based on a first amount of pixel overlap between inter-camera frames having the same time stamps; and (e) selecting the second sub-set of frames based on a second amount of pixel overlap between inter-camera frames having the same time stamps, wherein the first amount of pixel overlap is greater than the second amount of pixel overlap; and (f) separately registering the first sub-set of frames and the second sub-set of frames.

After separately registering the first sub-set of frames and the second sub-set of frames, the method stitches together the first and second sub-sets of frames to form a larger mosaic.

Receiving the set of sequential frames from each of the cameras includes receiving a Zig-2 pattern of frames from each of the cameras.

Selecting the first sub-set of frames and the second sub-set of frames includes selecting a number of frames from the Zig-2 pattern between one and four.

The method may extract a point of interest from the first and second sub-sets of frames, after separately registering the first and second sub-sets of frames; and update a control information base (CIB) with the extracted point of interest.

Receiving the set of sequential frames from each of the cameras includes receiving frames formed by each of the cameras viewing a circle of persistence (COP).

It is understood that the foregoing general description and the following detail description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

The following description of the present invention, as an exemplary embodiment, describes registration and mosaicking of sequences of images obtained by multiple infrared (IR) cameras disposed in an aircraft rig. It will be understood, however, that the present invention may apply to any array of cameras, such as EO cameras, housed in an aircraft or a UAV.

Figure 1:
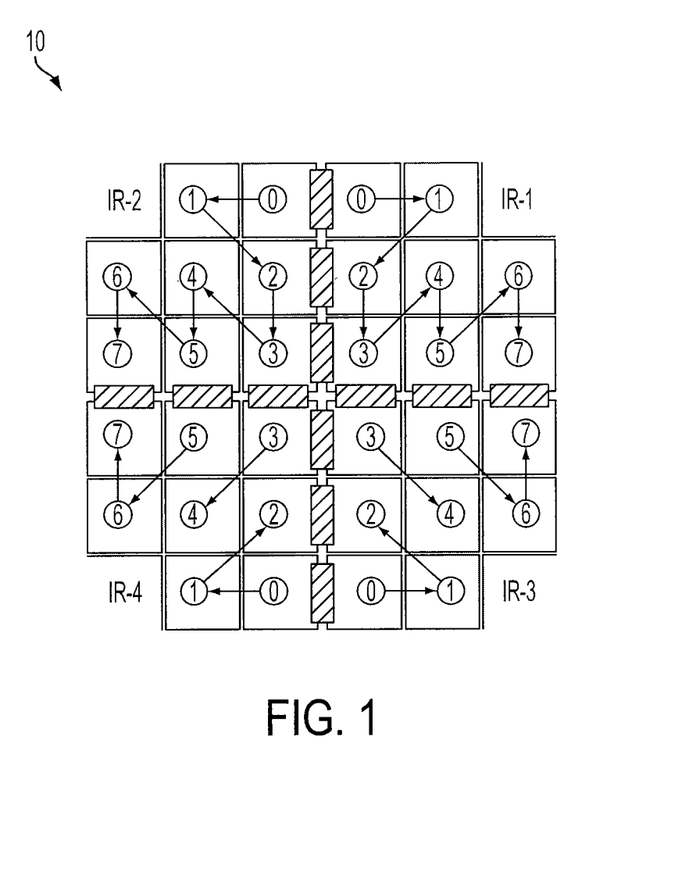
FIG. 1 is a pictorial of an exemplary set of eight sequential images taken temporally by four independent cameras (IR cameras, as an example) viewing a region of interest, the entire 32 images referred to as a full field frame.

Referring first to FIG. 1, there is shown a set of 32 images produced by four IR cameras disposed in an integral housing of a UAV. As shown, the set of 32 images are formed by four separate IR cameras, referred to as IR-1, IR-2, IR-3 and IR-4. Each IR camera includes a field steerable mirror (FSM) that sequentially focuses a respective beam onto eight spatial locations of a scene. The eight spatial locations result in eight sequential images, which are labeled sequentially as 0-7.

The four IR cameras are timed, so that the inter-camera timing of correspondingly numbered images occur at precisely the same time. Thus, for example, image 0 of each IR camera is taken precisely at the same time. In a similar manner, for example, image 3 of each IR camera is taken precisely at the same time. The eight images from each IR camera result in the 32 small images, collectively referred to herein as a full field frame, designated generally as 10.

As also shown, the small eight images (0-7) of each IR camera includes a small overlap (for example, an overlap of 25 pixels). The small overlap is depicted as a white strip extending vertically or horizontally between each small image. For example, image 0 and image 1 include a vertical overlapping strip of pixels, whereas image 2 and image 3 include a horizontal overlapping strip of pixels.

The inventors observed that during movement of the sensor's FSM, when sequentially generating small images 1 and 2, there are no overlapping pixels at these two consecutive times ($t_1$ and $t_2$); this may be observed by moving from image 1 to image 2 (only a point is common). The same observation may be seen when moving from small image 3 to small image 4, and when moving from small image 5 to small image 6.

Also shown in FIG. 1 are wide, shaded vertical and horizontal strips formed among the four field of views of the IR cameras (inter-camera). These vertical and horizontal strips represent a large pixel overlap between the inter-camera images (when compared relative to the small overlap between the intra-camera images). The large pixel overlap may include 125 pixels (for example).

The 32 small images forming the full field frame are updated at a 2 Hz rate (for example). As the aircraft (or UAV) flies orbits that are centered on a target area, most of the same area is collected repeatedly. These orbits generate an ellipse with major and minor axes that are equal. This is referred to herein as generating a circle of persistence (COP). The circle of persistence, of course, is only as good as the pilot and the flight control system.

In order to extend the field of view of the cameras, each camera uses an independent FSM which scans the region of interest. The FSM is likely the cause of most of the errors in the resulting image quality of the full field frame. These errors are further exasperated by the combination of inaccuracies in the camera model and the scanning by each FSM.

The inventors discovered that other dominant factors affecting image quality of a full field frame are the temporal sampling of the 32 small image frames during unknown platform motion. The unknown platform motion is due to inaccuracies, for example, in the IMU and the GPS, and in the imprecise gimbals and errors in positioning of the FSMs. The inventors also discovered that the small pixel overlap between each small image (images 0-7 in FIG. 1) is not sufficient for compensating errors in platform motion. On the other hand, a larger overlap is needed between each small image, in order to produce a stabilized large mosaic.

Figure 2:
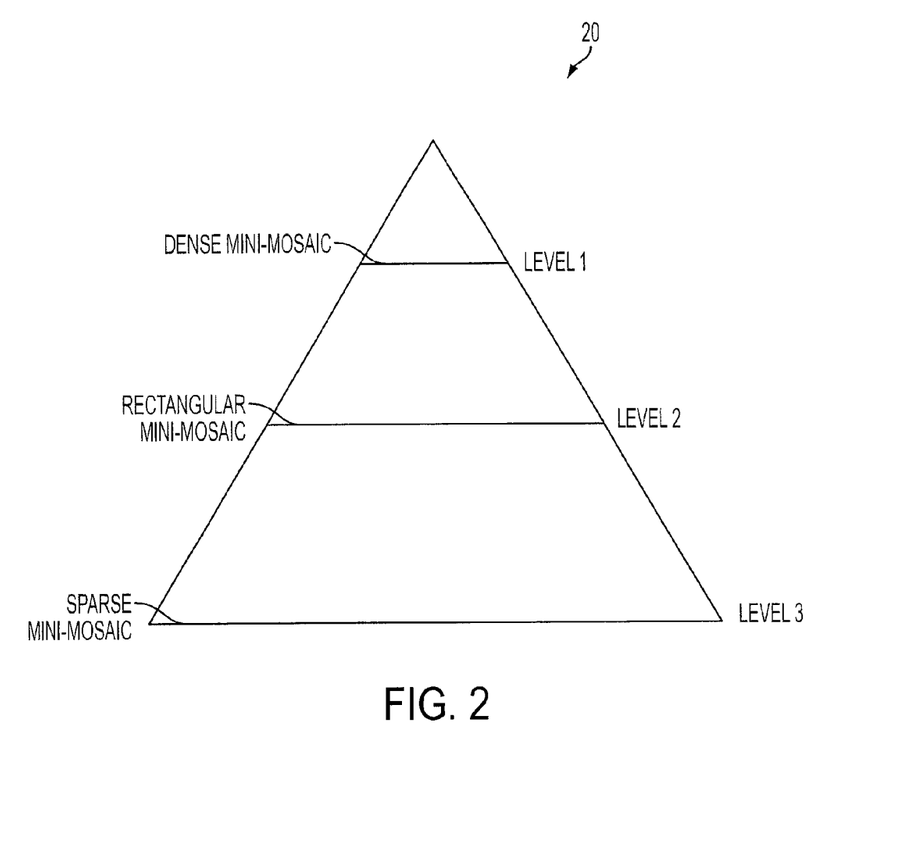
FIG. 2 is a functional block diagram of a three level hierarchical structure used for registering the 32 images shown in FIG. 1, in accordance with an embodiment of the present invention.

The present invention improves image quality, without needing any larger pixel overlap than the pixel overlap presently used between each small image (0-7). The present invention accomplishes this by using a hierarchical registration approach. As will be explained, the hierarchical registration approach removes the temporal nature of image acquisition and inserts a photogrammetric based approach, as shown in FIG. 2. The photogrammetric based approach may use, for example, two or more images taken from different positions. Common points may be identified on each image. A line of sight may be constructed from each camera location to the point on the object. It is the intersection of these lines that may determine the location of the point.

As shown in the exemplary embodiment, three levels of registration and stabilization are performed by the present invention, generally designated as 20. A top level, level 1, is referred to herein as registration and stabilization of a dense mini-mosaic. A middle level, level 2, is referred to herein as registration and stabilization of a rectangular mini-mosaic. A bottom level, level 3, is referred to herein as registration and stabilization of a sparse mini-mosaic. Each of these three mini-mosaics is described below.

It will be appreciated that level 1 provides the most inter-frame overlap and is, therefore, the largest and most stable mini-mosaic of the three mini-mosaics. Level 1 also provides the most dependable camera model. Level 3 provides the least amount of inter-frame overlap and is, therefore, the least stable mini-mosaic of the three mini-mosaics. Level 3 provides an opportunity, however, to obtain additional data for checking and verification of the camera model.

Level 2 provides registration and stabilization opportunities that are better than level 3, but not as good as level 1. Level 2 provides inter-frame overlap due to imaging geometry and, therefore, achieves a lower level of stability as compared to level 1. Some level of camera modeling may be obtained by level 2.

Figure 3:
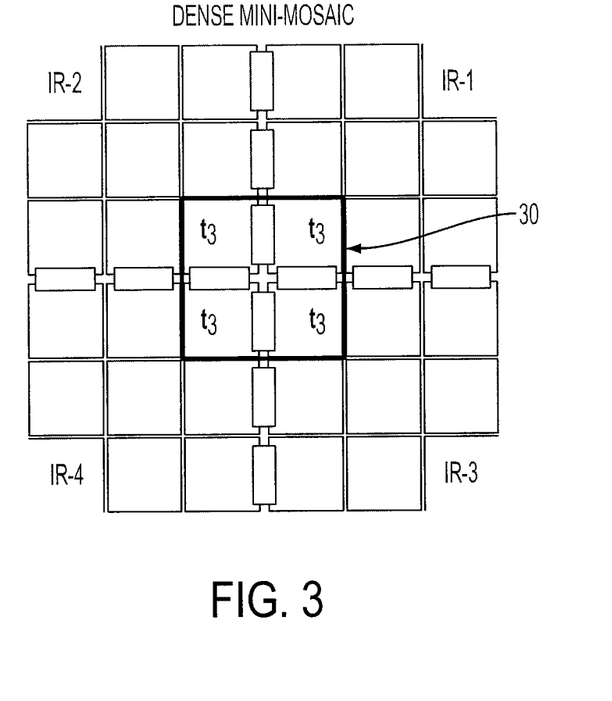
FIG. 3 is a pictorial of a registration approach at the top level of the hierarchical structure shown in FIG. 2, referred to herein as a dense mini-mosaic, in accordance with an embodiment of the present invention.
Figure 4:
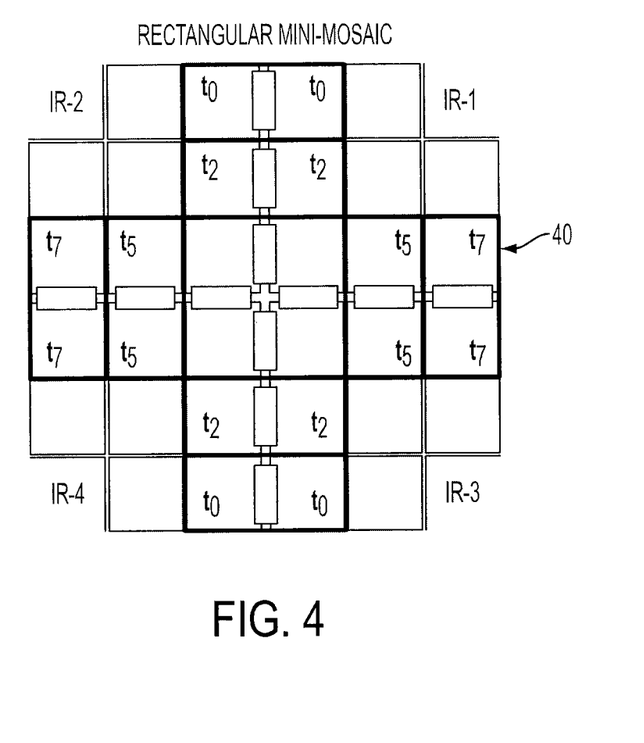
FIG. 4 is a pictorial of a registration approach at the middle level of the hierarchical structure shown in FIG. 2, referred to herein as a rectangular mini-mosaic, in accordance with an embodiment of the present invention.
Figure 5:
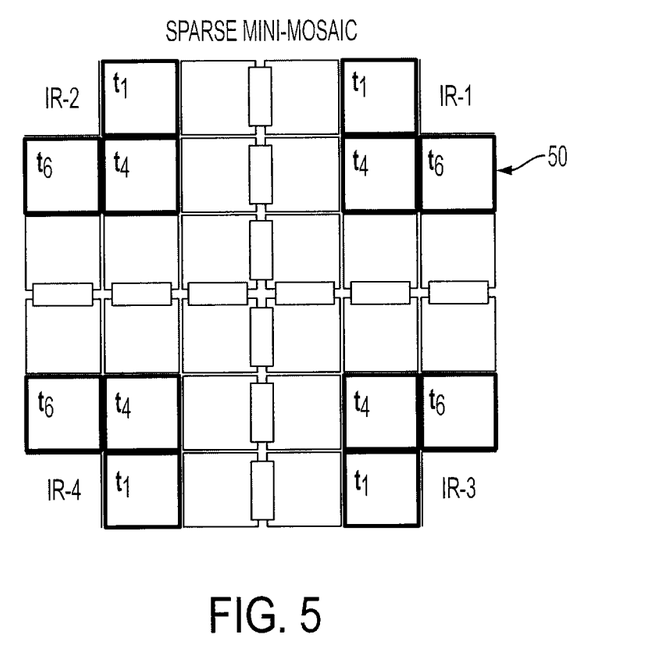
FIG. 5 is a pictorial of a registration approach at the bottom level of the hierarchical structure shown in FIG. 2, referred to herein as a sparse mini-mosaic, in accordance with an embodiment of the present invention.

The three levels of hierarchical registration using the mini-mosaics are shown in FIGS. 3, 4 and 5. Referring to FIG. 3, a dense mini-mosaic is shown, generally designated as 30. The dense mini-mosaic 30 includes four independent mini-images (frames) taken by IR-1, IR-2, IR-3 and IR-4 during time $t_3$, in the time ordered acquisition sequence of $t_0$-$t_7$, which corresponds to the four independent FSM sweeps shown in FIG. 1, as sweeps 0-7 of each IR camera.

The dense mini-mosaic 30 includes four individual images (frames) occurring rigidly at the same time (the IR cameras are precisely timed to obtain the $t_3$ frame at the same time). The dense mini-mosaic has a common pixel overlap that is the largest of all the mini-mosaic images. It also has the largest amount of overlap from frame to frame (inter-camera overlap). Lastly, in a circle of persistence, the center of persistence usually lands in the dense mini-mosaic region. Consequently, the dense mini-mosaic 30 provides several benefits, namely: (1) a highly registered mosaic, (2) a highly stabilized mosaic, and (3) an accurate transformation for an IR camera update.

Referring next to FIG. 4, there is shown a rectangular mini-mosaic, generally designated as 40. The rectangular mini-mosaic 40 includes two individual frames, $t_0$ and $t_2$, both taken by each IR camera occurring rigidly at the same time. In addition, the rectangular mini-mosaic 40 includes two additional individual frames, $t_5$ and $t_7$, both taken rigidly at the same time by each IR camera.

It will be appreciated that the rectangular mini-mosaic has two individual frames occurring rigidly at the same time in the vertical direction, and two individual frames occurring rigidly at the same time in the horizontal direction. The rectangular mini-mosaic also has a large amount of pixel overlap from frame to frame (not as large, however, when compared to the dense mini-mosaic 30). In addition, the rectangles of the mini-mosaics extend in the direction of rotation in a persistence circle.

Consequently, the rectangular mini-mosaic 40 provides the following benefits: (1) a registered mosaic, (2) a stabilized mosaic, and (3) a possible transformation for IR camera update.

Lastly, the sparse mini-mosaic, generally designated as 50, is shown in FIG. 5. The sparse mini-mosaic 50 provides three individual frames ($t_1$, $t_4$ and $t_6$) that occur rigidly at the same time, when taken by each of the four IR cameras. These three individual frames only have small intra-camera pixel overlaps; there are no large pixel overlaps from frame to frame (inter-camera overlap). However, the sparse mini-mosaic 50 provides additional samples for the overall mosaicking process of the present invention. The sparse mini-frames may also be used by the present invention for registration, or stabilization. These mini-frames may be used for validating the transformation model that is applied to the camera model.

Figure 6:
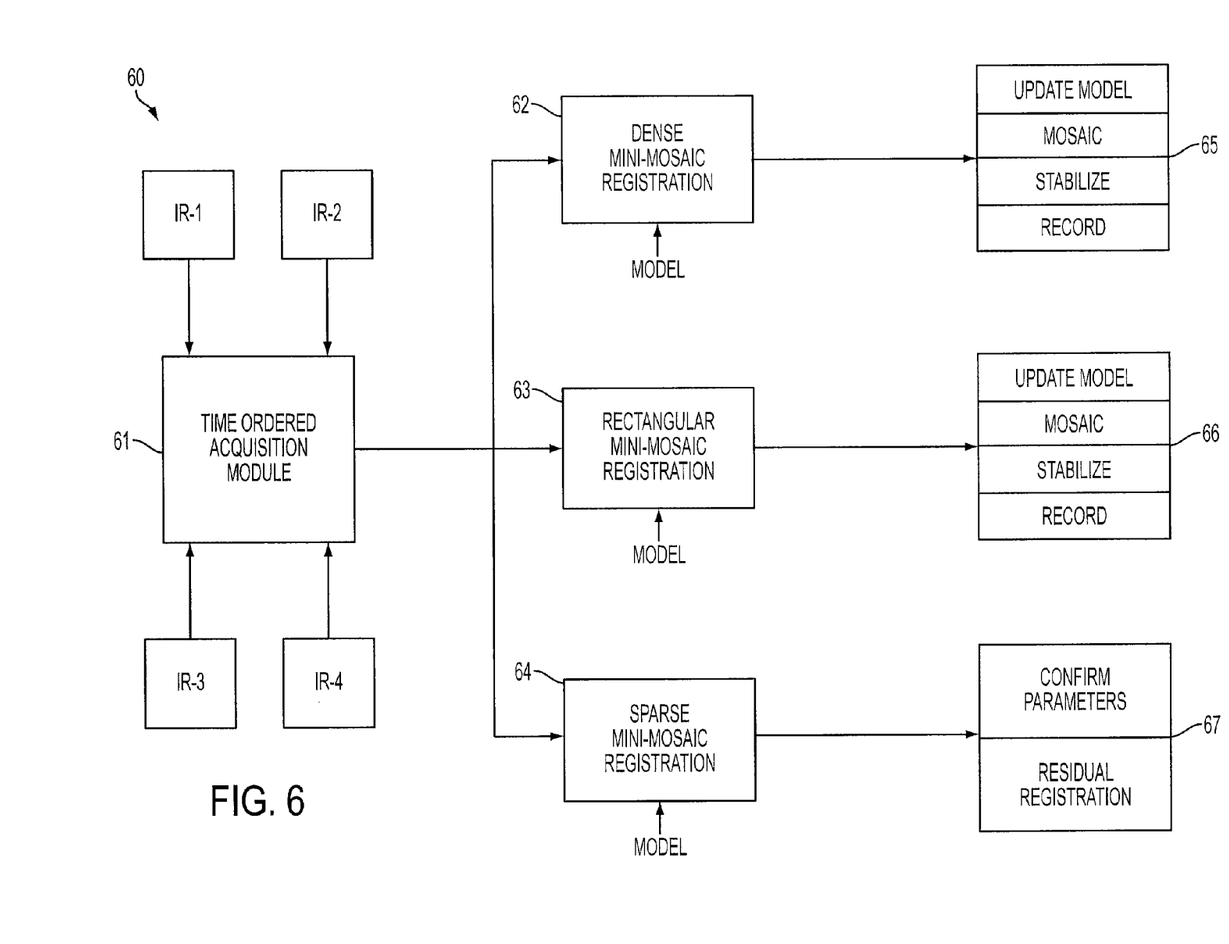
FIG. 6 is an exemplary algorithm for registration, mosaicking and stabilization of multiple images, in accordance with an embodiment of the present invention.

Referring next to FIG. 6, there is shown an exemplary photogrammetric algorithm used by the present invention for providing registration and mosaicking of images taken by multiple IR cameras. The algorithm, generally designated as 60, receives sequential mini-images by scanning (via an FSM) a region of interest. After a sequence of eight mini-images are completed, each camera retraces its scan back to the position marked by mini-image 0. This pattern of scanning eight mini-regions and then retracing back to the position marked by mini-image 0 is generally referred to as a Zig-2 pattern. Since the rig that houses the four IR cameras rotates about a center of persistence, the 32 mini-images shown in FIG. 1 rotate about a center region.

The algorithm proceeds, by way of module 61, by receiving four sets of eight sequential mini-images 0-7. The four sets of eight mini-images are temporally ordered in time, so that the first four mini-frames are taken during time to. The next four mini-frames are taken during time $t_1$, etc. The last four mini-frames are taken during time $t_7$. Thus, 32 mini-frames are temporally acquired during times $t_0$ through $t_7$.

The algorithm next deviates from a time ordered acquisition process and provides a hierarchical registration method, as described with respect to FIGS. 3-5. Still referring to FIG. 6, algorithm 60 sends mini-frames 3 (taken at time $t_3$) from each of the four IR cameras to module 62 for the dense mini-mosaic registration (level 1). Similarly, algorithm 60 sends mini-frames 0, 2, 5 and 7 (taken, respectively, at times to, $t_2$, $t_5$ and $t_7$) from each of the four cameras to module 63 for the rectangular mini-mosaic registration (level 2). Finally, algorithm 60 sends mini-frames 1, 4 and 6 (taken, respectively, at times $t_1$, $t_4$ and $t_6$) from each of the four cameras to module 64 for the sparse mini-mosaic registration (level 3).

In one embodiment of the present invention, registration of the mini-mosaics are performed by using a control image base (CIB). The CIB includes ground truths that are loaded into memory or storage device of the image surveillance system (see FIG. 9). The mini-mosaics are registered with the CIB at every coordinated FSM position. The present invention achieves the highest level (level 1) of registration during $t_3$ with the dense mini-mosaic. A medium level (level 2) of registration is achieved during to, $t_2$, $t_5$ and $t_7$. A low level (level 3), but some degree of registration is achieved during $t_1$, $t_4$ and $t_6$.

In another embodiment of the present invention, registration is performed by stabilizing the images to the previous full field frame. Thus, points of interest located in the previous full field frame are registered to points of interest located in the present (or current) mini-frames comprising the present (or current) full field frame.

Since image registration is performed on a mini-mosaic level, instead of a conventional full field frame (32 images) level, variations in the camera model used for registration may be sampled at a rate that is eight times faster (corresponding to the eight FSM steps, 0-7, of each camera), than a conventional to sampling rate. If, for example, it takes 500 msec (2 Hz rate) to sample variations in the full field frame, the present invention may sample variations in the camera model every 62.5 msec (16 Hz rate).

The model may be interrogated by algorithm 60 at consecutive times with mini-image overlap. Thus, the largest overlap is between $t_2$ and $t_3$, which occurs at the approximate middle of the FSM scan (see FIG. 1). The next amount of overlap occurs between $t_0$ and $t_1$; $t_4$ and $t_5$; and $t_6$ and $t_7$. Of course, the model may also be interrogated at non-consecutive times.

Figure 7:
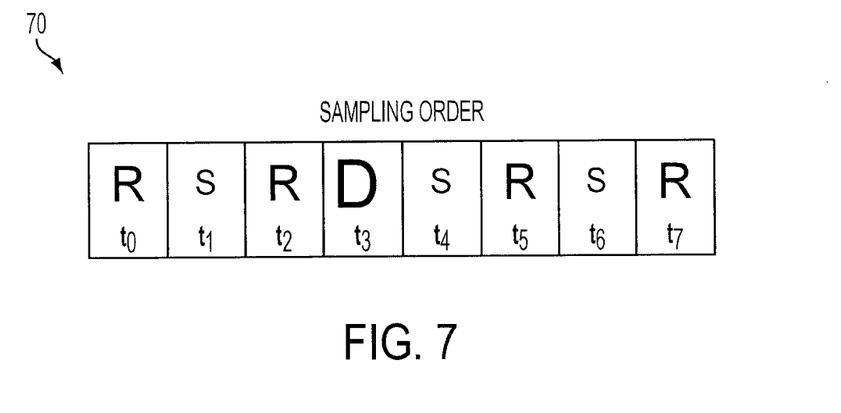
FIG. 7 is an exemplary sampling order of sequential images as performed by an embodiment of the present invention.

FIG. 7 shows a sampling order, used by the present invention, which is designated as 70. The R refers to a rectangular mini-frame at times to, $t_2$, $t_5$ and $t_7$. The small S refers to a sparse mini-frame at times $t_1$, $t_4$ and $t_6$. The D refers to a dense mini-frame at time $t_3$.

It will be appreciated that the exemplary sampling order includes a small pixel overlap between $t_0$ and $t_1$; $t_4$ and $t_5$; and $t_6$ and $t_7$ (all are intra-camera). The large pixel overlap is between $t_2$ and $t_3$, and is due to both intra-camera overlap and inter-camera overlap. It will also be appreciated that the present invention does not have any adjacent samplings of small S frames.

Referring back again to FIG. 6, the algorithm updates the model using modules 65 and 66. Since the sparse mini-mosaic does not have overlapping consecutive mini-images (there are only a few common edge pixels), module 67 does not update the model.

Figure 8:
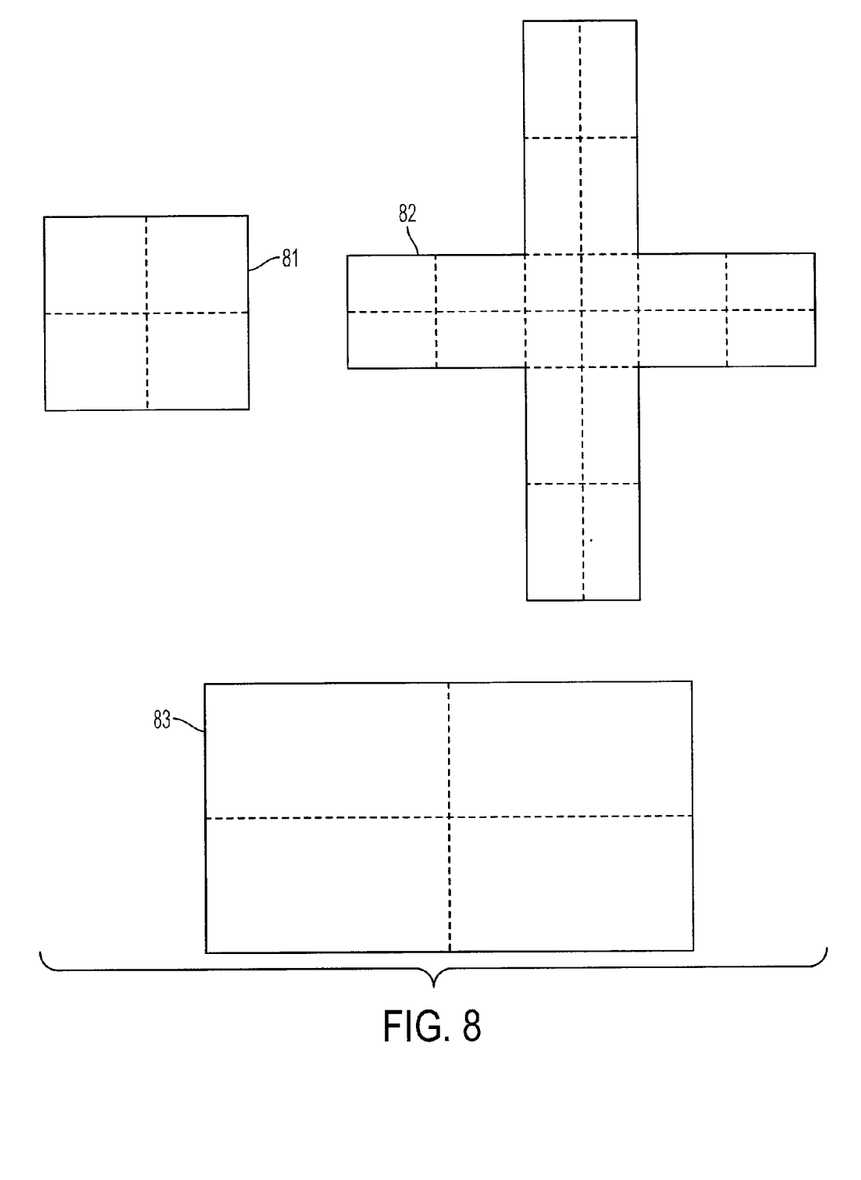
FIG. 8 is a pictorial of three levels of stitching performed by an embodiment of the present invention.

Module 65 mosaics four independent camera frames to provide seamless stitching of the four $t_3$ mini-frames. The first seamless mosaic is shown as mosaic 81 in FIG. 8. Module 66 also mosaics four independent camera frames to provide seamless stitching between the $t_0$ and $t_2$ mini-frames, and between the $t_5$ and $t_7$ mini-frames. When the mosaics of module 65 and 66 are joined, the algorithm forms the second seamless mosaic, generally designated as 82. After considering the residual registration performed by module 67, the algorithm forms the third seamless mosaic (32 frames), as shown by mosaic 83 in FIG. 8.

The present invention uses one or a combination of pixel-based stabilization and/or feature-based stabilization. Pixel-based stabilization may include block matching (blocks are matched using sum-and-difference); optical flow (spatiotemporal derivatives are used to determine motion); and/or cross-correlation (a block intensity compared against a normalized cross-correlation (NCC) is scored against other blocks). Feature-based stabilization may include dual boot registration (a set of algorithms working together); scale invariant feature transformation (SIFT) (assigns key points around blobs in image); Harris detection (detects corner features); and/or wavelet processing (corners, edges, points, features, etc. are detected from wavelet coefficients).

Figure 9:
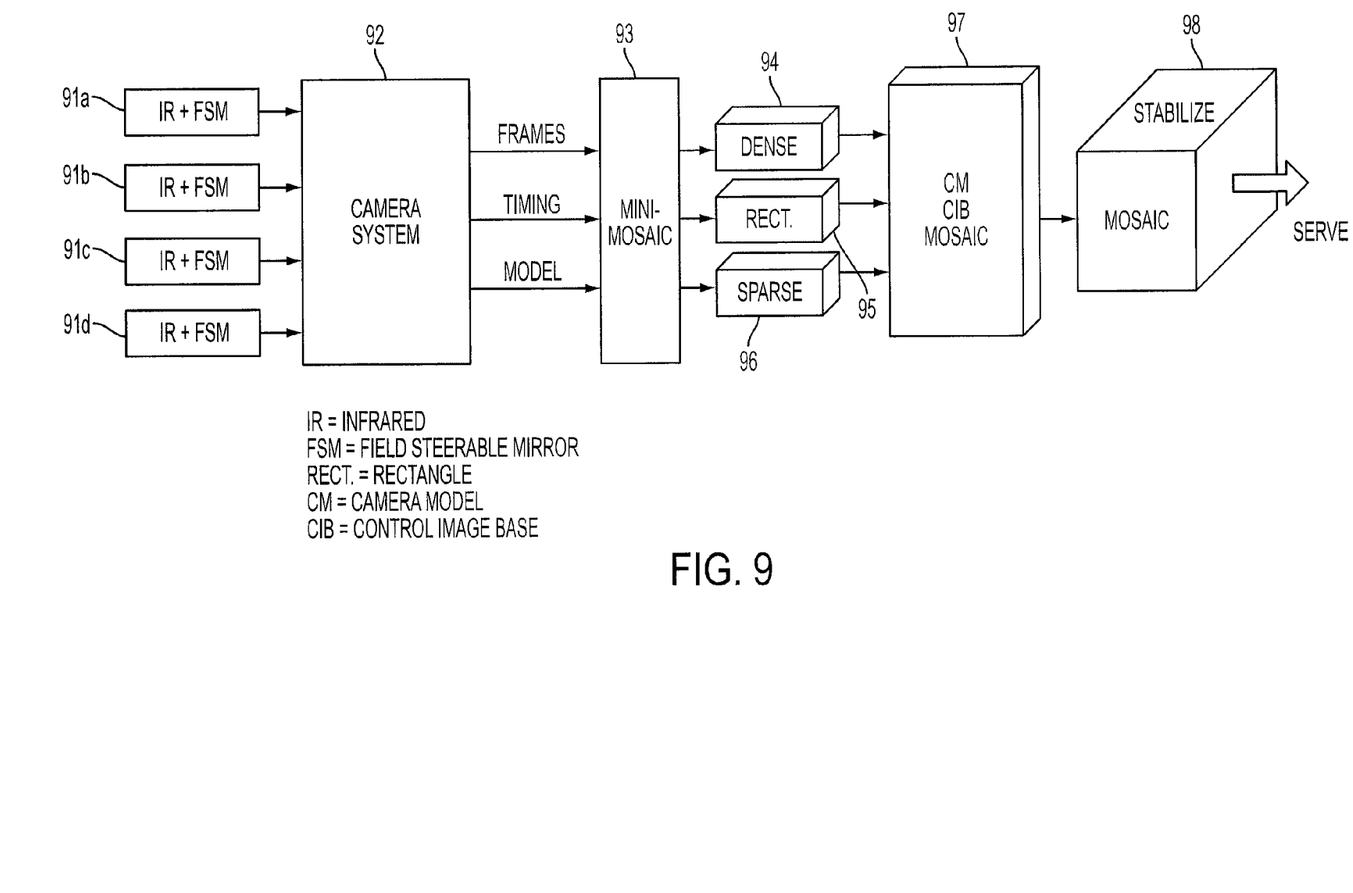
FIG. 9 is a block diagram of a surveillance system using four infrared cameras (as an example) to obtain, register and mosaic multiple images, in accordance with an embodiment of the present invention.

Referring next to FIG. 9, there is shown a wide area surveillance system (exemplified as an IR system), generally designated as 90. System 90 includes four independent IR cameras that are scanned via four independent FSM modules, shown designated as 91a through 91d, respectively. The four IR cameras may be mounted in a turret on an aircraft or a UAV. The cameras are typically mounted in a single frame, so that the ground views of the cameras are approximately those shown in FIG. 1.

The FSM position of each IR camera may be commanded to achieve a 28 pixel minimum overlap within a Zig-2 pattern (shown in FIG. 1). The IR camera factory alignment may achieve a 150 pixel minimum overlap. The camera system module 92, which includes the electronics and controls for the IR cameras, receives the mini-image frames from the four independent IR cameras. The eight mini-frames taken by each IR camera are rigidly timed to correspond to the eight mini-frames of the other IR cameras.

The camera system 92 also includes a modeling error of the components in the camera system. Camera system 92 provides the mini-frames, the timing of the mini-frames, and the error model to mini-mosaic module 93. The mini-mosaic module separates each of the eight mini-frames from each IR camera into three levels of mini-frames, namely, a dense mini-mosaic (module 94), a rectangular mini-mosaic (module 95) and a sparse mini-mosaic (module 96). The three levels of mini-mosaics are then provided to modules 97 and 98. These modules, as described before, provide updates for the camera error model, updates for the control image base (described later) and the separate mosaicking of the three levels of mini-frames. The three levels of mini-frames are then mosaicked together to form the final mosaic. The frames, after being stabilized, registered and mosaicked, may be provided as a final output into a database or to an observer.

Module 97 includes the camera model(s), which is used to transform the images. The camera model(s) requires updates. These updates may include mini-mosaic inter-frame correlation, mini-CID registration, and/or mini-mosaic overlaps. The model may be updated to capture inaccurate mosaic parameters.

Figure 10:
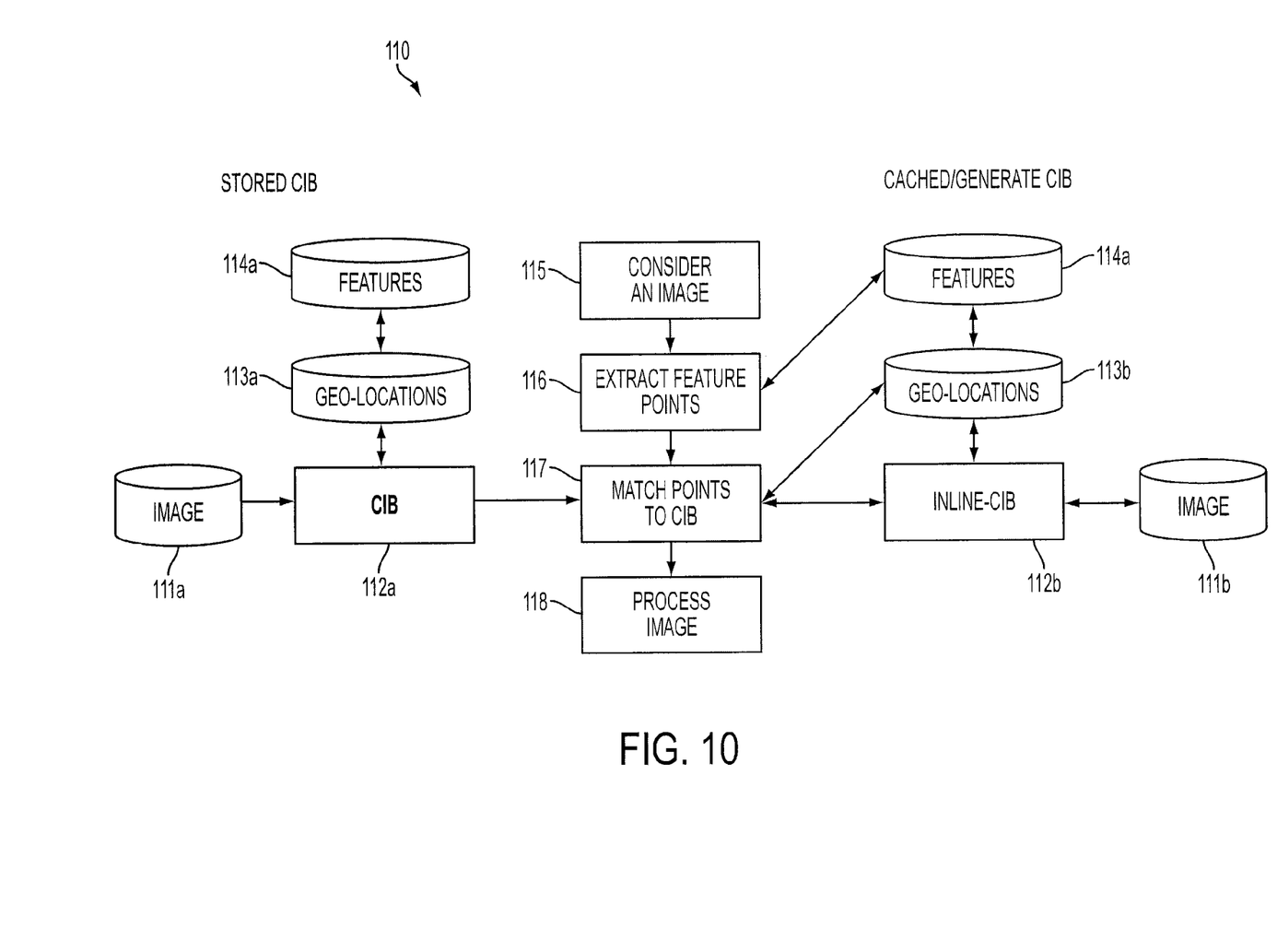
FIG. 10 is a block diagram of a control image base (CIB) used by an embodiment of the present invention.

Referring now to FIG. 10, there is shown another embodiment of the present invention. As shown, system 110 includes a stored CIB and a separate buffered or cached CIB. The stored CIB, designated as 112a, receives images from storage 111a before aircraft takeoff. The CIB also includes stored features 114a and stored geographic locations 113a. The CIB is used to register the images received from the infrared cameras with the stored features and geographic locations found in the databases. The present invention, however, adds an inline-CIB, designated 112b, which may improve upon the stored CIB 112a.

As an image 115 is received by the surveillance system, various feature points may be extracted from the image by module 116. These features may be matched by module 117 to feature points already stored in CIB 112a. As new feature points are obtained, the inline-CIB may become more accurate than the initially stored CIB. By considering images received from the IR cameras, the inline-CIB may obtain better features than features initially stored in the CIB, because the latter typically includes features that are obtained from images taken by an EO camera.

Figure 11:
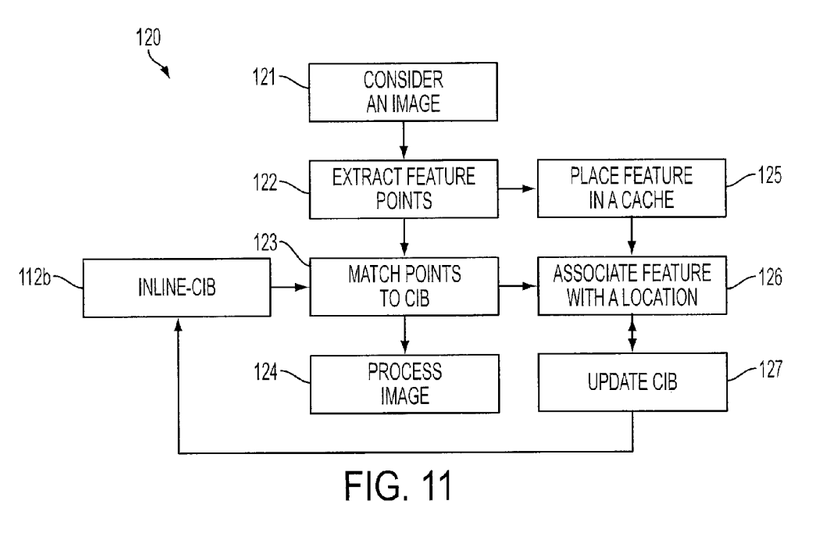
FIG. 11 is a method for updating the CIB shown in FIG. 10, in accordance with an embodiment of the present invention.

An exemplary method, designated as 120, for updating and improving the accuracy of a CIB is shown in FIG. 11. As shown, method 120 considers an image taken by an IR camera (step 121). Features points are extracted from the image (step 122). The feature points extracted from the image are then placed in a cache (step 125). Each extracted feature point is next compared to a geographic location (step 126). After a successful comparison, the feature is associated with a geographic location, and the CIB is updated with the new feature (step 127). The updated feature is then used by the algorithm to register the image (step 124).

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for registration of frames obtained by multiple cameras comprising:
a processor for receiving a set of sequential frames from each of the cameras, each set of sequential frames having a sequence of time stamps that corresponds temporally to each other set of sequential frames obtained by each of the other cameras,
the processor selecting a number of frames, which is between one frame and less than a total number of frames in each set, and
the processor registering the selected number of frames in each set with the selected number of frames in each other set,
the processor selects at least one frame for a first set of sequential frames and at least one frame for a second set of sequential frames, wherein the at least one frame for the first set includes an overlap of pixels with the at least one frame for the second set of sequential frames, and
the selected at least one frame of the first set and the selected at least one frame of the second set are registered to each other; and
the processor selects at least one frame for a third set of sequential frames and at least one frame for a fourth set of sequential frames, wherein the at least one frame for the third and fourth sets includes overlap of pixels only within each respective third and fourth sets, and
the selected frames within the third set and the selected frames within the fourth set are registered to each other only within each respective third and fourth sets.

2. The system of claim 1 wherein
the processor selects one frame for each set of sequential frames, the selected one frame located at an inner portion of a field of view in a circle of persistence (COP), and
the selected one frame of each camera, which is located at the inner portion of the COP, is registered with the selected one frame of the other camera.

3. The system of claim 1 wherein
the selected at least one frame of the first set and the selected at least one frame of the second set include the same time stamp period.

4. The system of claim 1 including
a control information base (CIB) for storing a predetermined point of interest, wherein the processor is configured to extract a point of interest, after registration of the selected number of frames in each set with the selected number of frames in each other set, and the extracted point of interest is used to update the predetermined point of interest stored in the CIB.

5. A method for registering frames obtained by multiple cameras comprising the steps of:

receiving a set of sequential frames from each of the cameras, wherein each of the sets has the same sequence of time stamps;

selecting a first sub-set of frames, wherein the first sub-set of frames includes a number of frames between one and less than the total number of frames in the set;

selecting a second sub-set of frames, wherein the second sub-set of frames includes a number of frames between one and less than the total number of frames in the set;

selecting the first sub-set of frames based on a first amount of pixel overlap between inter-camera frames having the same time stamps; and selecting the second sub-set of frames based on a second amount of pixel overlap between inter-camera frames having the same time stamps, wherein the first amount of pixel overlap is greater than the second amount of pixel overlap; and separately registering the first sub-set of frames and the second sub-set of frames.

6. The method of claim 5 including the step of:

after separately registering the first sub-set of frames and the second sub-set of frames, stitching together the first and second sub-sets of frames to form a larger mosaic.

7. The method of claim 5 wherein receiving the set of sequential frames from each of the cameras includes receiving a Zig-2 pattern of frames from each of the cameras; and selecting the first sub-set of frames and the second sub-set of frames includes selecting a number of frames from the Zig-2 pattern between one and four.

8. The method of claim 5 including the steps of:

extracting a point of interest from the first and second sub-sets of frames, after separately registering the first and second sub-sets of frames; and updating a control information base (CIB) with the extracted point of interest.

9. The method of claim 5 wherein receiving the set of sequential frames from each of the cameras includes receiving frames formed by each of the cameras viewing a circle of persistence (COP).

* * * * *